United States Patent [19]

Bryan

[11] Patent Number: 5,274,686
[45] Date of Patent: Dec. 28, 1993

[54] ANODIC VACUUM ARC DEPOSITION

[75] Inventor: William J. Bryan, Granby, Conn.

[73] Assignee: Combustion Engineering, Inc., Windsor, Conn.

[21] Appl. No.: 951,395

[22] Filed: Sep. 25, 1992

[51] Int. Cl.⁵ .............................................. G21C 3/00
[52] U.S. Cl. ..................................... 376/414; 376/457; 376/416
[58] Field of Search ............... 376/414, 416, 457, 417, 376/419; 427/37, 239, 419.7; 976/DIG. 53, DIG. 117

[56] References Cited

U.S. PATENT DOCUMENTS

| | | | |
|---|---|---|---|
| 4,873,117 | 10/1989 | Hertz et al. | 427/37 |
| 4,894,256 | 1/1990 | Gartner et al. | 427/39 |
| 4,895,765 | 1/1990 | Sue et al. | 428/627 |
| 4,917,786 | 4/1990 | Ehrich | 204/192.38 |
| 5,026,517 | 6/1991 | Menken et al. | 376/438 |
| 5,096,558 | 3/1992 | Ehrich | 204/192.38 |

Primary Examiner—Donald P. Walsh
Assistant Examiner—Meena Chelliah
Attorney, Agent, or Firm—L. James Ristas; John H. Mulholland

[57] ABSTRACT

A method for enhancing the wear and corrosion resistance of a tubular nuclear fuel assembly component (40), comprising the step of coating the component with a corrosion and wear resistant material by an anodic arc plasma deposition process (70). The coating is preferably a nitride reactively formed during the plasma deposition process. The component is preferably a nuclear fuel rod cladding tube and the coating material is one of ZrN or TiN.

8 Claims, 2 Drawing Sheets

ANODIC VACUUM ARC DEPOSITION

BACKGROUND OF THE INVENTION

This invention relates generally to fuel rods and other components employed in nuclear reactors. More particularly, the present invention relates to fuel rod cladding tubes and other zirconium-alloy components.

Fuel rods having outer cladding tubes are mounted in support grids of nuclear reactor fuel assemblies. Because of the harsh environment of the fuel assembly where the surrounding water temperature is typically 400° C. and the water has a relatively high pressure, the cladding tube is susceptible to wear and corrosion. At the lower portions of the reactor assembly, the cladding tubes can also be exposed to debris fretting. In addition, severe wear forces can arise at the location of the grid support.

Practitioners in this field are aware that a thin coating of zirconium nitride on a zirconium alloy tube, can dramatically improve wear and corrosion resistance. Such coatings can be applied by any one of a variety of techniques such as ion implantation or plasma spray as disclosed, for example, in U.S. Pat. No. 4,724,016 (Anthony) and U.S. Pat. No. 5,026,517 (Menken et al). More recent attempts include cathodic arc reactive deposition as disclosed in copending U.S. Ser. No. 514,870 (Bryan et al). These techniques, however, exhibit relative strengths and weaknesses, so that none has emerged as clearly superior.

SUMMARY OF THE INVENTION

An object of the present invention is to provide a new and improved wear and corrosion resistant coating for a cladding tube employed in a nuclear reactor.

Another object of the invention is to provide a new and improved coating which may be applied to a zirconium-alloy nuclear cladding tube in an efficient and cost effective manner.

A further objective of the invention is to provide a new and improved coating for a cladding tube which has enhanced resistance to debris fretting and corrosion and has an outer diameter which does not significantly increase the coolant flow resistance in the fuel assembly.

It is a more specific object of the present invention to provide a cladding tube for a nuclear fuel assembly component, particularly a fuel rod, which has a thin film of zirconium nitride coating the outside surface. The zirconium nitride coating may be applied on a portion of the tube which will be located below or in the vicinity of a particular fuel assembly support grid, or on substantially the entire outside surface of the tube. A film having a thickness of approximately 5 microns is effective in resisting corrosion and wear of the cladding tube, which usually has a zirconium-alloy composition.

The thin film of zirconium nitride is applied to the cladding tube by reactively depositing zirconium nitride on the surface of the cladding tube by an anodic arc plasma deposition process. The cladding tube is heated to a temperature in a range of approximately 300° to 400° C. in the presence of nitrogen.

The anodic vacuum arc differs from the cathodic vacuum arc in that the arc is sustained by material evaporated from the anode, as opposed to the cathode. In the anodic vacuum arc, the cathode is either totally inactive without eroding cathode spots or has many rapidly moving spots on the cathode surface. All of the material that sustains the arc is emitted by the anode. Until recently, steady state arcs sustained by anodic material were only known for currents exceeding 400 A. In these high current arcs, anodic evaporation occurs in large luminous spots at the surface of the anode. High current anodic arcs were known predominantly in vacuum breakers where the aim of investigations was to minimize the erosion of the anode through elimination of the anodic arc. Several investigators have reported on the characteristics of low current microsecond-duration anode spots. In these experiments the arc was pulsed for approximately 10 $\mu$sec at currents as low at 20A. Due to the short pulse length, very little material evaporation from the anode occurred and the usefulness of anodic evaporation for the deposition of coatings was not investigated.

Recently, however, several investigators have found a new steady state mode of operation of the anodic vacuum arc at much lower currents, typically less than 100 A. In these low current anodic arcs the anode is tailored in order to enhance evaporation. The cathode is designed either for minimal erosion, by using a refractory material such as carbon or tungsten, or is manufactured of the same material as the anode. In either case the cathode is designed so as not to heat up appreciably. By tailoring the anode it has been possible to achieve rapid evaporation of the anode material without macroparticle inclusion that occurs in the cathodic arc. The anodic vacuum arc produces a metal vapor plasma that, unlike the fully ionized plasma of the cathodic arc, is only partially ionized (~20%). In the anodic arc, the ions are singly ionized and have a directed energy of approximately 5 eV while the electrons have a temperature of less than 1 eV. Near the anode, the density of the expanding plasma is approximately $1 \times 10^{18}/cm^3$ while the neutral density is an order of magnitude higher.

Coatings deposited with the low current anodic vacuum exhibit all of the desirable qualities of coatings deposited with plasma assisted deposition techniques, and cathodic arcs in specific, but do not suffer from many of the problems that these methods entail. In particular, the anodic arc rapidly produces coatings that are of a very high quality and do not suffer from macroparticle inclusion.

Other advantages of the invention will become apparent from the drawings and the specification.

DESCRIPTION OF THE PREFERRED EMBODIMENTS

Figure 1:
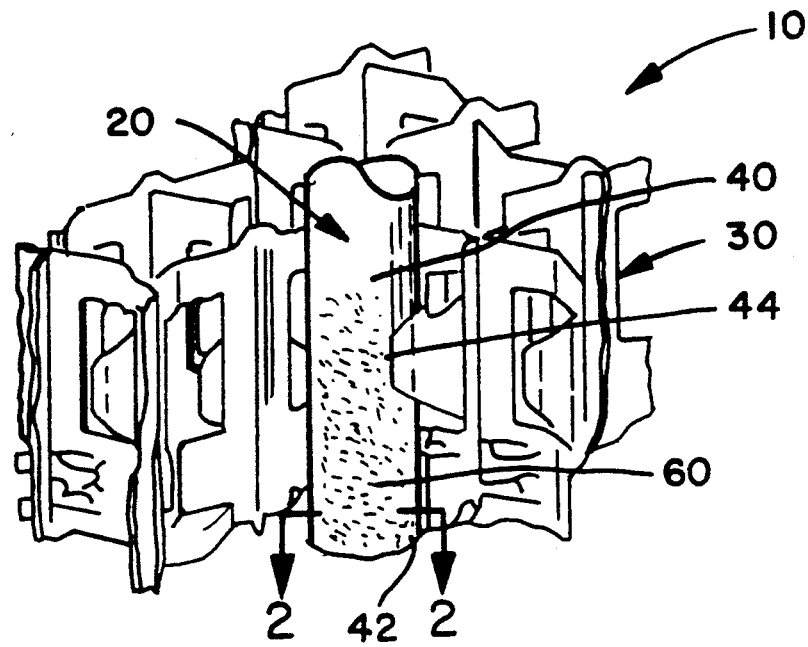
FIG. 1 is a fragmentary view, partly in schematic, of a fuel assembly containing a rod which incorporates the wear resistant coating of the present invention.

With reference to the drawings wherein like numerals represent like parts throughout the figures, a portion of a fuel assembly for which the present invention has application is generally designated by the numeral 10. Fuel assembly 10 is employed in a nuclear reactor and includes a plurality of fuel rods 20 which are mounted to a lower support grid 30. The fuel rods have a cladding tube 40 which contains fissionable fuel pellets 50.

The cladding tube 40 is manufactured from a zirconium-alloy or other suitable alloy. The invention will be primarily described with reference to a zirconium-alloy cladding tube.

Figure 2:
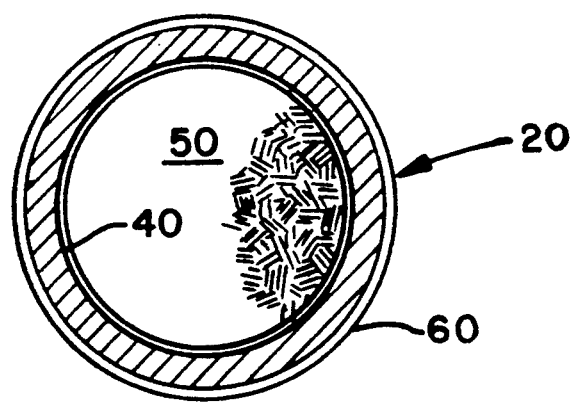
FIG. 2 is an enlarged cross-sectional view of a cladding tube of the fuel assembly of FIG. 1 taken along the line 2—2 thereof.

In accordance with the invention, the cladding tubes have a coating 60 on at least a portion of the outside surface. The coating 60 is a thin film composed substantially of zirconium nitride. The film may have a thickness on the order of approximately 5 microns. The relative dimension of the coating 60 is exaggerated in FIG. 2. The thin film of zirconium nitride is wear resistant, and constitutes a barrier which resists corrosion of the tube substrate. Because of the relative thin film thickness, e.g., approximately 5 microns, the outer diameters of the coated cladding tubes or fuel rods do not significantly increase the coolant flow resistance through the fuel assembly 10.

While the thin film of zirconium nitride may be applied to the zirconium-alloy cladding tube along substantially the entire length of the tube, the thin film is especially advantageous in the region 42 below the support grid where the tube is particularly susceptible to debris fretting due to the metallic particles and the high pressures and high temperatures of the surrounding water. In addition, the zirconium nitride coating may be applied in the region 44 of the cladding tube which engages the lower support grid 30 to enhance the corrosion and wear resistance of the tube.

The zirconium nitride coating 60 is reactively deposited on the zirconium-alloy cladding tube 40 by means of an anodic ion plating process in apparatus 70 such as described, for example, in the following documents:

H. Ehrich, "The Anodic Vacuum Arc. I. Basic Construction and Phenomenology", J. Vac. Sci Technol. A, 6, 134 (1988).

H. Ehrich et al, "The Anodic Vacuum Arc. II. Experimental Study of Arc Plasma", J. Vac. Sci. Technol. A, 6, 2499 (1988).

S. Meassick et al, "Anodic Vacuum Arc Deposition Processes", International Conference on Metallurgical Coatings and Thin Films, Apr. 22-26, 1991.

S. Meassick et al "Investigation of the Properties of Type 303 Stainless Steel Thin Films Deposited with the Anodic Vacuum Arc", Mat. Res. Lett., 11, 66 (1992).

Figure 3:
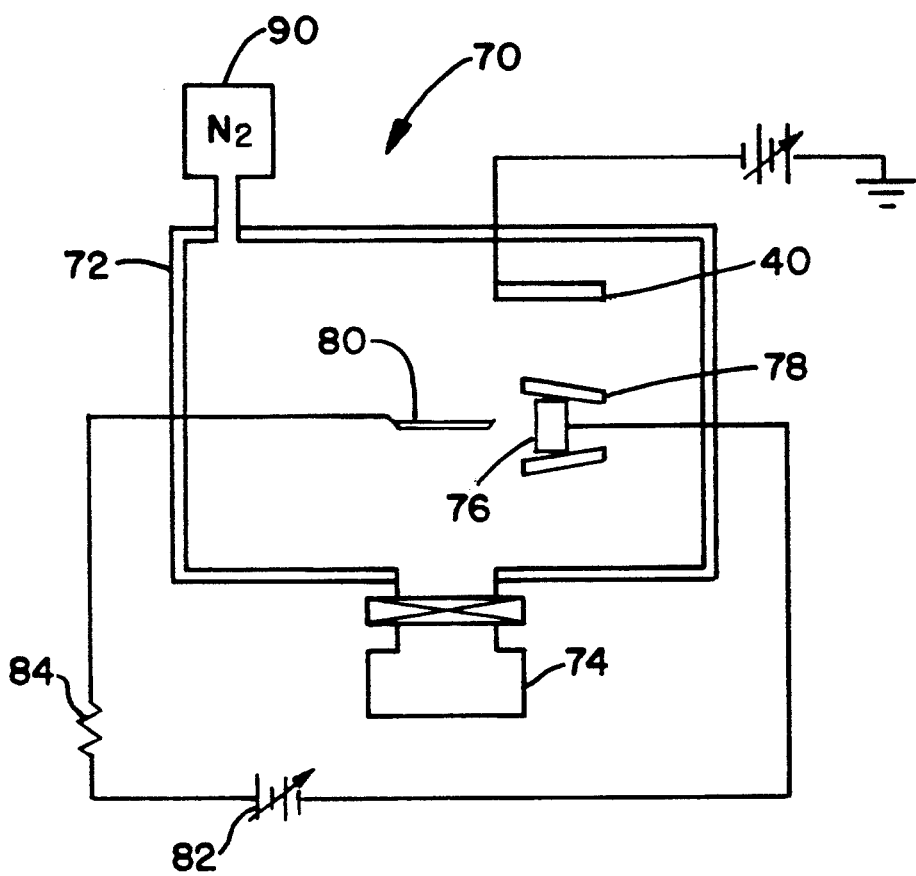
FIG. 3 is a schematic diagram of an apparatus for coating the cladding tube of FIG. 2.

A schematic representation of a prototype apparatus is shown in FIG. 3. The vacuum chamber 72 is pumped via a diffusion pump 74 to a base pressure of approximately $1 \times 10^{-6}$ Torr. During operation of the anodic arc the pressure in the chamber rises to approximately $1 \times 10^{-5}$ Torr. The cathode 76 consists of either a carbon, tungsten or zirconium rod 2.5 cm in diameter surrounded with a ceramic shield 78 so that there is no line of sight to the target fuel rod cladding tube 40. The anode 80 is constructed of a crucible into which the source material to be evaporated is placed. The crucible allows for the use of a substantial amount of material (on the order of 10 grams), and allows the direction of the metal vapor plasma to be tailored. Either tungsten or ceramic crucibles can be used. In the case of tungsten, part of the arc current is intercepted by the crucible, thereby indirectly heating the crucible. This indirect heating places limits on the current at which the arc can be run so that the material evaporated does not overheat and cause nucleate boiling. The crucible can also be constructed of a ceramic material ($Al_2O_3$) in which case a separate tungsten electrode can be used to carry current to the anode material. This arrangement has the advantage that all of the current flows into the anode material, thereby heating its surface and greatly diminishing the chances of nucleate boiling.

The anodic arc is powered by a low voltage dc power supply 82 (100 V, 100 A), operated in a current regulating mode, through a current limiting resistor 84. During anodic arc operation the arc voltage is approximately 17-20 V, and in conjunction with radiation at the most intense spectral line of the evaporated material is characteristic of proper arc operation.

Ignition of the anodic arc occurs by physically contacting the anode 80 and cathode 76 together, thereby initiating a cathodic arc which transitions to the steady state anodic arc after approximately one second. After contact of the electrodes, one or more slowly moving cathode spots appear on the cathode 76, severely eroding it. In this phase the arc is sustained by cathodic material. The anode is heated due to ohmic heating and ion bombardment. Eventually, the anode 80 heats up sufficiently so that anode material is evaporated at which time the color of the arc changes to that of the most intense spectral line of the anode material and the cathode spots transform into many, rapidly moving spots that no longer erode the cathode. The anode to substrate distance is adjustable to approximately 45 cm. The substrate holder 86 is biasable positive or negative to approximately 300 V with a negative bias usually applied in order to accelerate ions into the target 40. The dc bias is applied via a low voltage (approximately 300) dc power supply 88. The rate of evaporation, and therefore deposition, are dependent on the arc current. Zirconium is the preferred anodic source material at 80, so that ZrN is reactively formed in chamber 72 with nitrogen supplied at 90 as backfill gas after evacuation. Titanium, to reactively form TiN, can also be used. Other anodic source materials that form nitrides in accordance with the invention, include hafnium (HfN), chromium (CrN), and tantalum (TaN). Materials can alternatively include TiAlVN, Cr, TiCN, TiC, CrC, ZrC, and NiTaB.

In work performed by the investigations cited above, evaporation rates of approximately 0.04 g/min/Amp (3.2 g/min at 80 A) were achieved for type 303 stainless steel anodes while evaporation rates of 0.06 g/min/Amp were achieved for Aluminium. The maximum evaporation rate from the anode 80 is only limited by the current available from the dc power supply 82 (100 A). The coatings deposited with the anodic vacuum exhibited good adherence to the substrate. Cellophane tape tests were used for the initial analysis. Indentation tests were performed for a more objective measure of the adherence of the film. In these tests, the surface of the substrate was dented with a diamond tipped probe and the cracking, delamination or spalling of the coatings near the dent was visually observed. The coatings deposited with the anodic vacuum arc showed no delamination of spalling and only minimal cracking around the edge of the dent.

Deposition rates of up to 6 $\mu$m/min were achieved at a distance of approximately 20 cm from the anode with an arc current of 80 A. The deposition rate decreases as the square of the anode to target separation. It is evident that there is a material dependent threshold current for deposition. Above this threshold current, the deposition rate increases linearly with current. Below a threshold current the voltage-current characteristic is negative (negative resistance). This threshold current is again material dependent and occurs at approximately the same current as the threshold current for deposition.

The threshold current for deposition is probably due to the fact that the anode must be heated sufficiently in order to allow evaporation to occur. Since radiation and conduction will be the primary cooling mechanisms of the anode before there is rapid evaporation, a larger heating current will be required for materials with a higher boiling temperature. Below this threshold voltage the arc is operating at least partially as a cathodic arc with cathode spots that cause erosion of the cathode. Above the threshold voltage, in addition to their rapid motion over the cathode, the cathode spots no longer cause erosion and the inclusion of cathode material in the coating. Thus, when operated in the anodic mode, the cathode spots are different in nature. The stoichiometry of the coatings showed that they were pure as far as could be determined with the EDS system.

The deposited thin films were examined with a scanning electron microscope (SEM) in order to ascertain the surface roughness and defect densities of the films. There were no discernable surface feature down to the resolution limit of the instrument (~4 nm). In addition, the surface was found to be free of macroparticle inclusions.

In order to evaluate the protective qualities of coatings deposited with the anodic vacuum arc, coatings of type 303 stainless steel, aluminium and nickel were deposited on iron substrates. The arc current for all samples used in the corrosion tests was 80 A. The corrosion inhibiting properties of these coatings against humid and marine environments was evaluated using salt spray fog testing according to standards ASTM B117 (10~) and MIL-STD 202F method 101D(11). Each sample was exposed to a salt spray environment at a temperature of 35° C. a humidity of 85% and a spray solution consisting of 5% NaCl dissolved in water. Tests were conducted for up to 48 hours on the samples. The 0.75 $\mu$m thick aluminium coating provided almost complete protection from corrosion. It is believed that the coating of ZrN will have similar effects on Zircalloy cladding corrosion. Coatings having a thickness in the range of about 3-7 microns should prove satisfactory.

This is in stark contrast to coatings deposited with a cathodic arc which seem to require coating thicknesses on the order of 20 $\mu$m in order to provide similar corrosion protection. While the 20 $\mu$m thickness was from deposition rates substantially higher than used in commercial cathodic arc coaters, resulting in a large number of macroparticles that are large in size, the thickness of the protective coating must be greater than the macroparticle size for effective corrosion protection. The relatively poor protective properties of cathodic arc coating is due to the voids that are created by the inclusion of macroparticles in the coating for the cathodic arc, allowing the salt spray to penetrate to the substrate.

The coatings produced with the anodic arc have no discernible surface texture and were amorphous in nature. An investigation of the protective properties of anodic arc coatings against salt spray indicates that even thin coatings can reliably protect a sample against corrosion.

I claim:

1. A method for enhancing the wear and corrosion resistance of a tubular nuclear fuel assembly component, comprising the step of coating the component with a corrosion and wear resistant material by an anodic vacuum arc plasma deposition process.

2. The method of claim 1, wherein the coating is a nitride reactively formed during the plasma deposition process.

3. The method of claim 2, wherein the component is a zirconium alloy.

4. The method of claim 3, wherein the component is a nuclear fuel rod cladding tube and the coating material is one of ZrN or TiN formed reactively in a nitrogen atmosphere during plasma arcing from a zirconium or titanium anode, respectively.

5. The method of claim 4, wherein the cladding tube is heated to a temperature in the range of 300° to 400° C. in the nitrogen atmosphere.

6. A method for applying a thin coating of zirconium nitride on the surface of a zirconium alloy nuclear fuel assembly tube comprising the step of reactively depositing zirconium nitride on said surface by an anodic vacuum arc plasma.

7. The method of claim 1, wherein the tube is a nuclear fuel rod cladding tube.

8. The method of claim 1, wherein the coating is a thin film in the range of approximately 3-7 microns.

* * * * *